United States Patent [19]

Leben et al.

[11] Patent Number: 4,710,438
[45] Date of Patent: Dec. 1, 1987

[54] ACTIVATABLE BATTERY

[75] Inventors: Yannick Leben, Bobigny; Louis D'Ussel, Paris, both of France

[73] Assignee: SAFT, S.A., Romainville, France

[21] Appl. No.: 2,985

[22] Filed: Jan. 13, 1987

[30] Foreign Application Priority Data

Oct. 23, 1986 [FR] France ................................ 86 14712

[51] Int. Cl.$^4$ ............................................. H01M 6/34
[52] U.S. Cl. ..................................... 429/119; 429/120
[58] Field of Search .................. 429/119, 120, 64, 72, 429/90, 110

[56] References Cited

U.S. PATENT DOCUMENTS

| 3,154,040 | 10/1964 | Neubert | 429/119 X |
| 3,542,598 | 11/1970 | White et al. | 429/64 |
| 3,941,616 | 3/1976 | Huhta-Kowisto | 429/119 |
| 4,198,474 | 4/1980 | Shah | 429/119 X |

FOREIGN PATENT DOCUMENTS 0078772  5/1982  Japan ................................... 429/119

Primary Examiner—Anthony Skapars
Attorney, Agent, or Firm—Kenyon & Kenyon

[57] ABSTRACT

A battery which is activatable by seawater and which uses electrochemical AgO/Al couples includes means (200, 12) for eliminating the aluminates which form in the electrolyte during discharge, and for regenerating the electrolyte.

6 Claims, 5 Drawing Figures

ACTIVATABLE BATTERY

The present invention relates to a battery which is activatable by water or by seawater, and which makes use, in particular, of the AgO/Al electrochemical couple. A battery of this type is used, in particular, in the propulsion of underwater vehicles.

BACKGROUND OF THE INVENTION

In outline, such a battery comprises:

an electrochemical block implementing AgO/Al couples and having an inlet and an outlet of a circuit for distributing an electrolyte based on sodium hydroxide; and said electrolyte distribution circuit comprises an inlet for seawater, a pump for pumping the electrolyte, a tank of electrolyte in solution including a first outlet which is directly connected to a first inlet of a thermostatic valve and a second outlet which is connected via a heat exchanger to a second inlet to said thermostatic valve whose outlet is connected to the inlet of said electrochemical block.

When the battery is activated, a valve is opened to cause seawater to enter into the electrolyte tank which contains solid sodium hydroxide, and the electrolyte distribution circuit is activated.

During discharge, aluminates form in the electrolyte and their concentration is such that they impose a limit on the duration for which the battery can be discharged. The concentration of aluminates is directly proportional to the electrical capacity delivered by the battery.

One way of avoiding this limitation on capacity would be to increase the volume of the electrolyte; however, this is impossible in most of the applications concerned because of the additional mass and bulk that result therefrom.

The aim of the present invention is to solve the problem of eliminating aluminates in a simple manner while avoiding the above-mentioned drawbacks.

SUMMARY OF THE INVENTION

The present invention provides a battery activatable by seawater and comprising an electrochemical block implementing AgO/Al couples and having an inlet and an outlet for an electrolyte distribution circuit for distributing a sodium hydroxide-based electrolyte, and said electrolyte distribution circuit which comprises:

an inlet for seawater;

a pump for pumping the electrolyte;

a tank for electrolyte in solution, said tank having a first outlet which is directly connected to a first inlet to a thermostatic valve, and having a second outlet which is connected to a second inlet of said thermostatic valve via a heat exchanger, the outlet from said thermostatic valve being connected to said inlet to said electrochemical block;

an exhaust outlet for hot electrolyte containing aluminates and controlled by a valve which is controlled as a function of a parameter that varies with the rate of aluminate generation; and means for regenerating the electrolytes, said means comprising a block of solid sodium hydroxide disposed in the cold electrolyte in the vicinity of the outlet from said heat exchanger.

In a highly advantageous first variant implementation, said parameter is the temperature of the electrolyte and said controlled valve is constituted by said thermostatic valve itself.

In another variant, said valve is controlled from a probe measuring the electrolyte temperature at the outlet from said electrochemical block.

In another variant, said valve is controlled by temperature probes measuring the temperature of the electrolyte at the inlet and at the outlet of said electrochemical block.

In another variant, said valve is controlled from a member for measuring the intensity of the electrical current delivered by the battery.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

Figure 1:
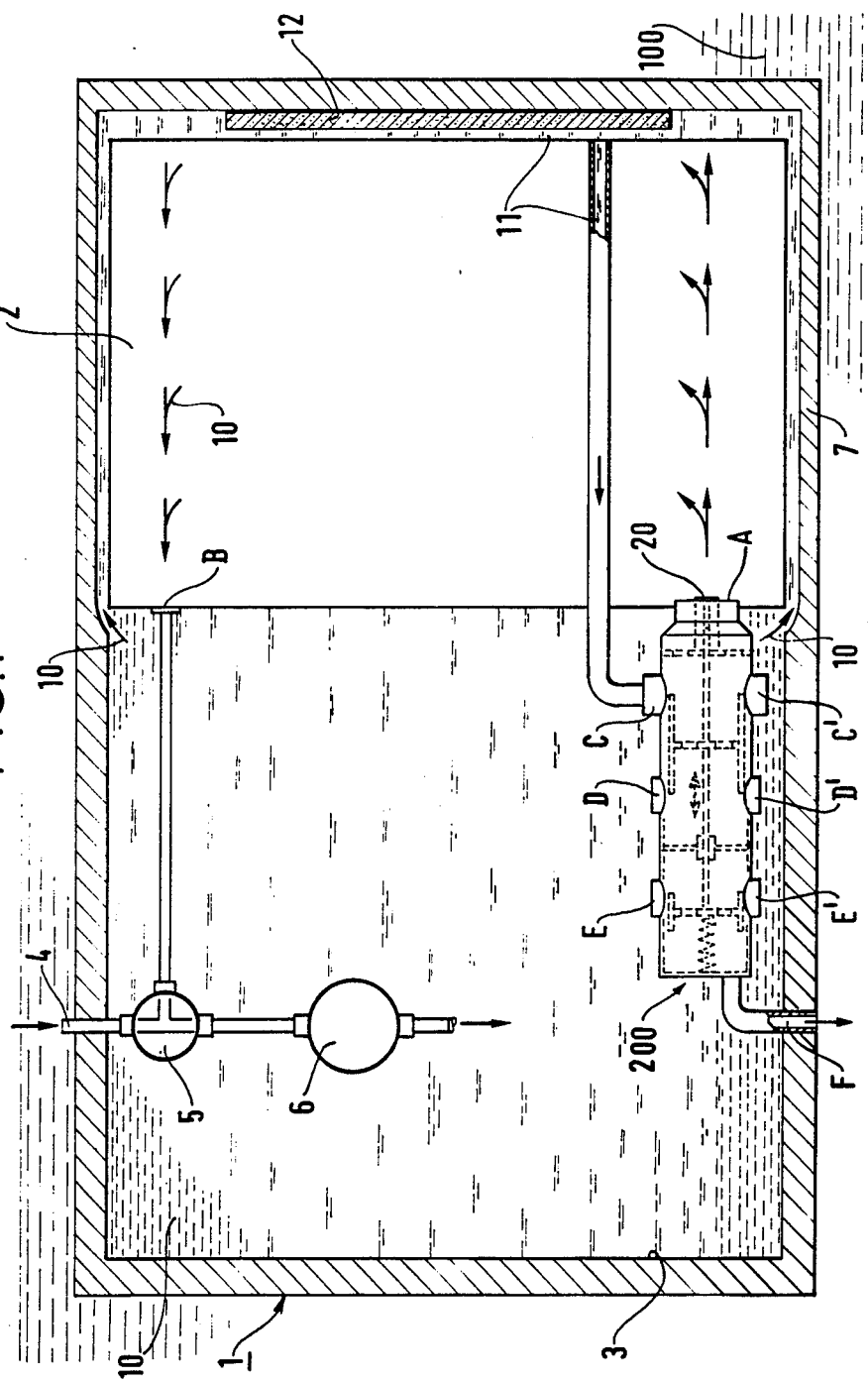
FIG. 1 is a diagram of an electrochemical block together with its electrolyte distribution circuit.

FIG. 1 is highly diagrammatic and shows an activatable battery disposed in the hull 1 of a vehicle immersed in seawater 100. The battery includes activating members which are not the subject of the present application, an electrochemical block 2 constituted by AgO/Al couples, and a distribution circuit for electrolyte 10, said electrolyte entering the block via an orifice A and leaving it via an orifice B. The distribution circuit comprises a tank 3, a pump 6, and a valve 5 connecting the pump to a seawater inlet 4.

The assembly constituted by the electrochemical block 2 and the electrolyte distribution circuit is surrounded by a heat exchanger 7 which is essential since the electrolyte temperature may rise to as much as 90° C. during discharge. Hot electrolyte 10 flows between the electrochemical block 2 and the hull 1 so as to be cooled by seawater. Cooled electrolyte 11 leaving the heat exchanger 7 via orifice C may be reinjected into inlet A of the electrochemical block by means of a thermostatic valve 200 which is shown in greater detail in FIG. 2.

This figure shows that the thermostatic valve 200 has inlets E, E', D, D' for hot electrolyte 10 and inlets C and C' for cooled electrolyte 11 coming from the heat exchanger 7. The thermostatic valve 200 is provided with a thermostatic capsule 20 and with a moving rod 21 which moves as a function of temperature and which co-operates by means of a spacer 22 and a return spring 23 with two pistons 24 and 25 housed in a body 26. The piston 24 is capable of closing the inlets D, D', C, and C' to a greater or lesser extent, while the piston 25 is suitable for closing the inlets E and E' to a greater or lesser extent, and consequently is capable of regulating the flow of electrolyte 10 via outlet F to the sea 100.

In accordance with the present invention, a cast block of sodium hydroxide 12 is disposed in the heat exchanger in the vicinity of the place where cooled electrolyte 11 leaves.

For example:
the quantity of electrolyte in the entire distribution circuit may be five liters;
its concentration may be about 8N;
the electrolyte flowrate may be 1.33 m³/hour;
the discharge may last for eight minutes;
the power may be about 20 kwatts,
the stroke of the moving rod 21 is set for a temperature range of 81° C. to 89° C.;
the heat exchanger must be such that the temperature of the electrolyte entering into the battery at A is maintained at about 81° C.; and
the mass of the cast sodium hydroxide block 12 is not less than 0.8 kg.

Figure 2:
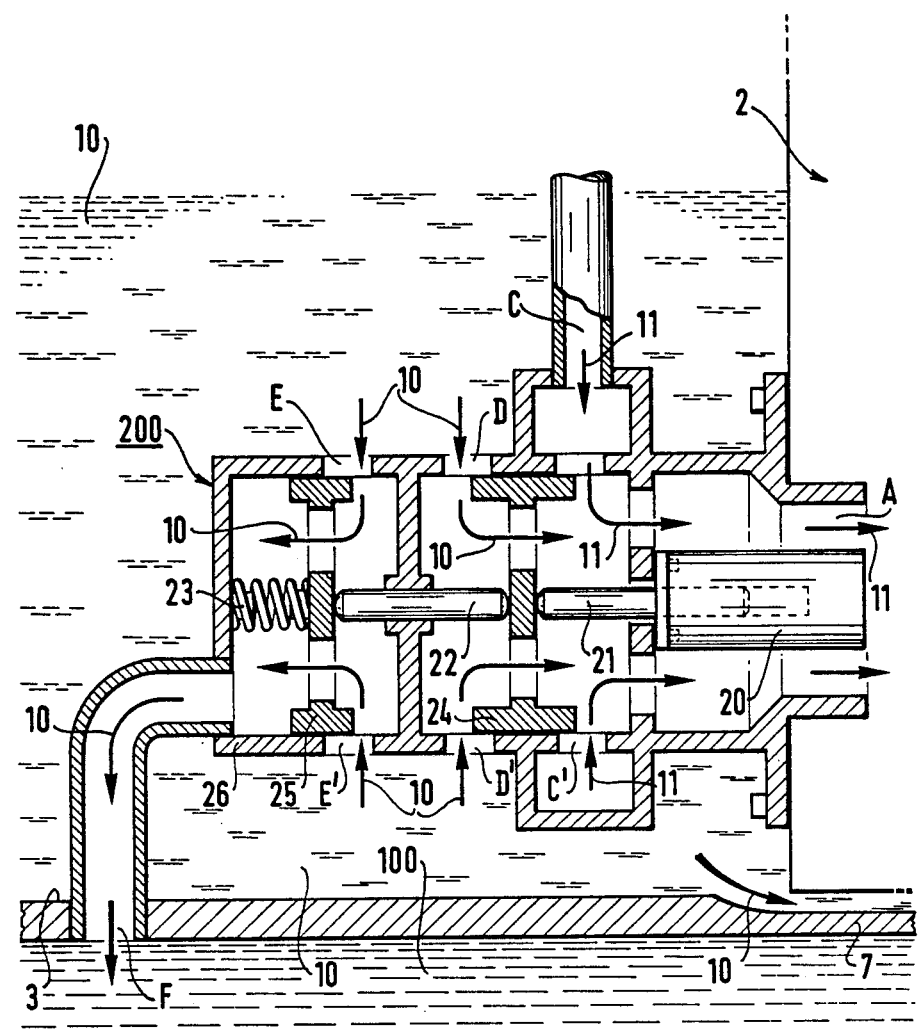
FIG. 2 is a diagram of the thermostatic valve used in the FIG. 1 distribution circuit.
Figure 3:
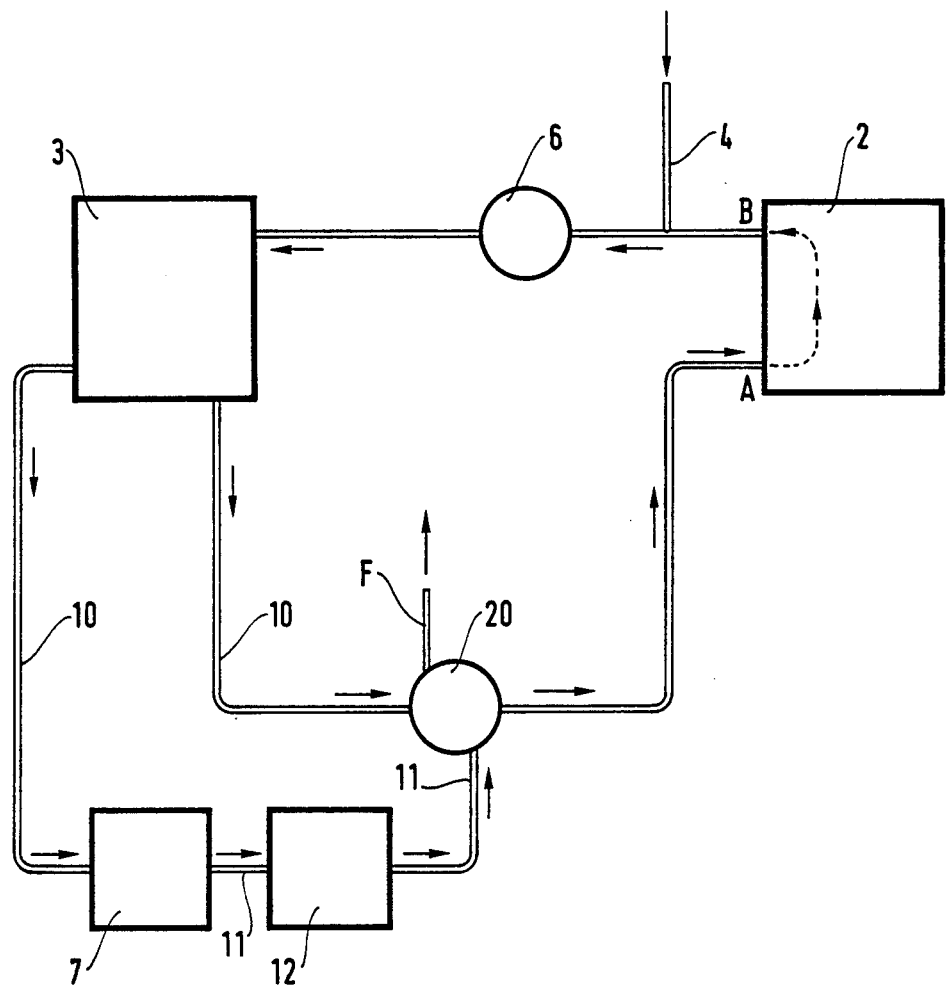
FIG. 3 is a block diagram for explaining the operation of the device shown in FIGS. 1 and 2.

The operation of the device in accordance with the invention can be seen more clearly from the diagram of FIG. 3 taken in conjunction with FIGS. 1 and 2.

After being activated and during a startup stage, the concentration of aluminates in the electrolyte 10 is low, and its temperature does not reach 81° C. so the rod 21 of the thermostatic capsule 20 remains retracted. Consequently, orifices C and C' are closed, orifices D and D' are open, and orifices E and E' are closed. The electrolyte 10 is fully recirculated into the electrochemical block 2, no electrolyte 10 is dumped into the sea at F, no additional sodium hydroxide is taken from the block 12, and the concentration of the sodium hydroxide solution remains acceptable.

As discharge continues, high electrical power is drawn and the temperature of the electrolyte 10 increases, as does its concentration in aluminates. At this moment, the rod 21 is progressively extended in the thermostatic valve 200, thereby displacing the pistons 24 and 25. As a consequence, an increasing flow of cooled electrolyte 11 dissolves the sodium hydroxide from the block 12 and enters the electrochemical block 2 via the orifice A. A flow of hot electrolyte 10 proportional to the flow passing into the heat exchanger 7 is rejected at F into the sea 100, thereby eliminating aluminates. The quantity of water lost from the electrolyte distribution circuit is automatically compensated by taking in new seawater via inlet 4.

Thus, the greater the need for the electrolyte 10 to be cooled, the greater the flow of electrolyte exhausted into the sea and the greater the flow through the heat exchanger, thereby increasing the extent to which the electrolyte is regenerated in sodium hydroxide. The mass of the block of sodium hydroxide 12 is selected so that the concentration of aluminates in the electrolyte never exceeds a critical value which, in the example given is 3 moles/liter. If operating conditions are different (current intensity, operating temperature, ...), this critical value varies over a range of 2.5 moles per liter to 3.5 moles per liter.

Figure 4:
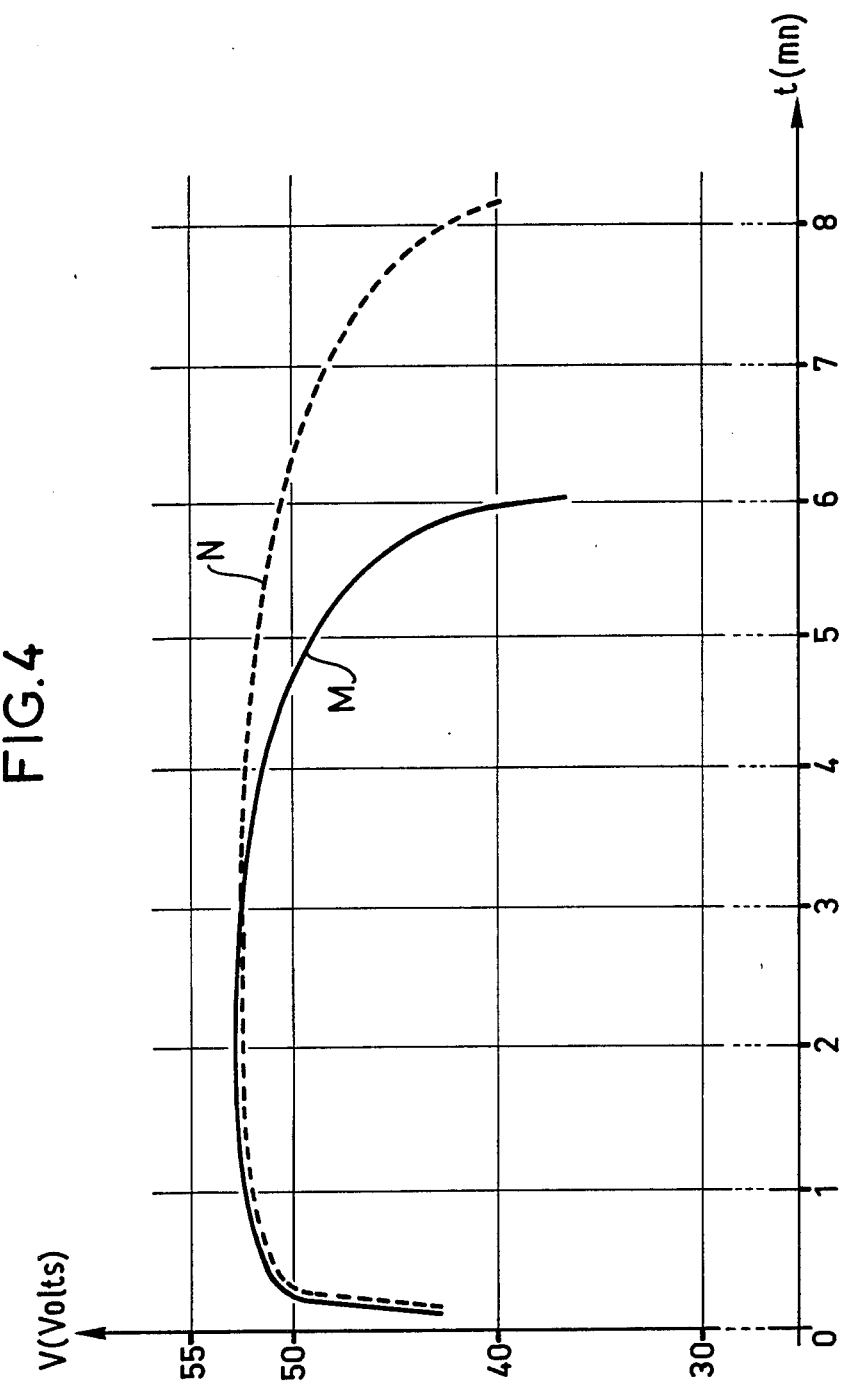
FIG. 4 is a graph showing the discharge curves of a prior art battery and of a battery having an electrolyte distribution circuit as shown in the preceding figures.

FIG. 4 is a graph showing the variation in voltage V as a function of time t (in minutes) delivered by a prior art battery (curve M) and by a battery in accordance with the invention (curve N). It can be seen very clearly that the present invention provides a considerable advantage during the last three minutes of discharge. The discharge time is increased by 35% for constant power delivery.

In the above-described example, the parameter used for controlling the process of exhausting electrolyte into the sea at F and for taking on new seawater at 4 to compensate for the loss in electrolyte is the temperature of the electrolyte. This parameter is related to the speed at which aluminates are generated and acts directly on the thermostatic capsule 20.

In a variant described below with reference to FIG. 5, the thermostatic valve 200 no longer provides this function, and the piston 25 is omitted. The thermostatic valve continues to mix hot and cold electrolyte (10 and 11) as a function of the temperature of the hot electrolyte 10. In addition, a probe 30 is provided for measuring the temperature of the electrolyte 10 at the outlet B from the electrochemical block 2. This probe is connected to computing means 31 which control a valve 32 for exhausting a suitable quantity of hot electrolyte 10 into the sea, with an equal quantity of seawater being immediately drawn into the system via inlet 4.

In another variant, the valve 32 may be controlled by a parameter constituted by the temperature difference between the electrolyte at B and the electrolyte at A, which temperature difference is likewise proportional to the speed at which aluminates are generated. Another possible parameter is the current delivered by the battery (which is easy to measure), or else the electrical capacity delivered by the battery.

Figure 5:
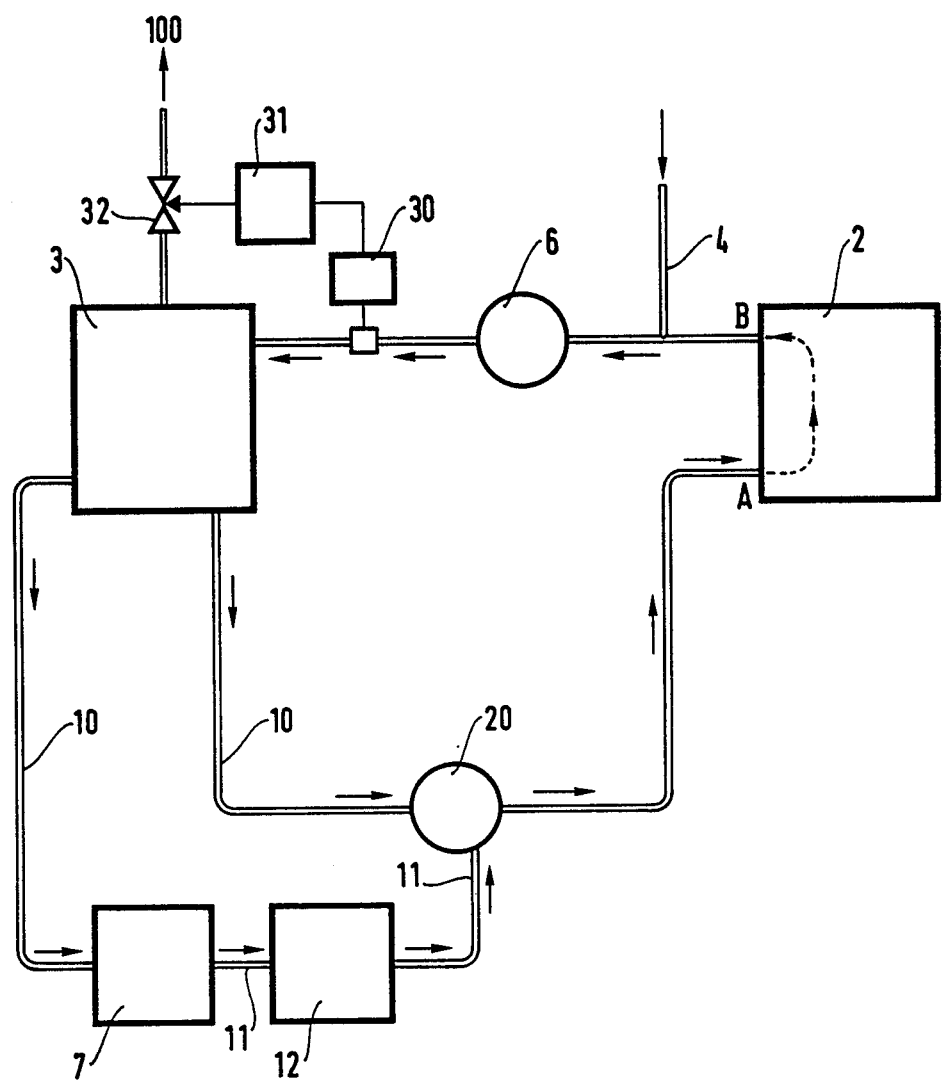
FIG. 5 is a block diagram of a variant distribution circuit.

These other variants are not illustrated, per se since they may readily be deduced from the circuit shown in FIG. 5.

Naturally, the invention is not limited to the abovedescribed implementations. Other equivalent means which fall within the scope of the claims are also covered.

We claim:

1. A battery activatable by seawater and comprising an electrochemical block implementing AgO/Al couples and having an inlet and an outlet for an electrolyte distribution circuit for distributing a sodium hydroxide-based electrolyte, and said electrolyte distribution circuit which comprises:

an inlet for seawater;
a pump for pumping the electrolyte;
a tank for electrolyte in solution, said tank having a first outlet which is directly connected to a first inlet to a thermostatic valve, and having a second outlet which is connected to a second inlet of said thermostatic valve via a heat exchanger, the outlet from said thermostatic valve being connected to said inlet to said electrochemical block;
an exhaust outlet for hot electrolyte containing aluminates and controlled by a valve which is controlled as a function of a parameter that varies with the rate of aluminate generation; and
means for regenerating the electrolytes, said means comprising a block of solid sodium hydroxide disposed in the cold electrolyte in the vicinity of the outlet from said heat exchanger.

2. An activatable battery according to claim 1, wherein said parameter is the temperature of the electrolyte at the outlet from said electrochemical block, and wherein said valve which is controlled as a function of said parameter is said thermostatic valve itself.

3. An activatable battery according to claim 1, wherein said parameter is selected from: the temperature of the electrolyte at the outlet from said electrochemical block; the difference in temperature between the electrolyte at the outlet and the electrolyte at the inlet of said electrochemical block; the intensity of the current delivered by said battery, and the capacity delivered by said battery; said battery including a member for measuring said parameter, said member being connected to computing means for controlling said valve for exhausting electrolyte.

4. An activatable battery according to claim 1, in which the mass of said block of solid sodium hydroxide is such that the concentration of aluminates in the electrolyte always remains below a critical value lying in the range 2.5 moles per liter to 3.5 moles per liter.

5. An activatable battery according to claim 2, in which the mass of said block of solid sodium hydroxide is such that the concentration of aluminates in the electrolyte always remains below a critical value lying in the range 2.5 moles per liter to 3.5 moles per liter.

6. An activatable battery according to claim 3, in which the mass of said block of solid sodium hydroxide is such that the concentration of aluminates in the electrolyte always remains below a critical value lying in the range 2.5 moles per liter to 3.5 moles per liter.

* * * * *